US012202712B2

(12) United States Patent
Dangel et al.

(10) Patent No.: US 12,202,712 B2
(45) Date of Patent: Jan. 21, 2025

(54) CRANE AND METHOD FOR MONITORING THE OPERATION OF SUCH A CRANE

(71) Applicant: Liebherr-Werk Biberach GmbH, Biberach an der Riss (DE)

(72) Inventors: Alexander Dangel, Ummendorf (DE); Manfred Fakler, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 756 days.

(21) Appl. No.: 17/327,449

(22) Filed: May 21, 2021

(65) Prior Publication Data

US 2021/0276840 A1 Sep. 9, 2021

Related U.S. Application Data

(63) Continuation of application No. PCT/EP2019/081274, filed on Nov. 14, 2019.

(30) Foreign Application Priority Data

Nov. 21, 2018 (DE) ..................... 10 2018 129 352.6

(51) Int. Cl.
*B66C 23/90* (2006.01)

(52) U.S. Cl.
CPC .... *B66C 23/905* (2013.01); *B66C 2700/0342* (2013.01)

(58) Field of Classification Search
CPC .................. B66C 23/26; B66C 23/905; B66C 2700/0342
See application file for complete search history.

(56) References Cited

U.S. PATENT DOCUMENTS

| | | | | |
|---|---|---|---|---|
| 9,365,398 B2 | 6/2016 | Benton et al. | | |
| 2009/0276126 A1* | 11/2009 | Morath | B66C 23/80 | 340/685 |
| 2015/0210514 A1* | 7/2015 | Albinger | B66C 23/76 | 212/270 |

FOREIGN PATENT DOCUMENTS

| | | |
|---|---|---|
| CN | 102464270 | 5/2012 |
| CN | 102910543 | 2/2013 |
| CN | 103787215 | 5/2014 |
| CN | 107207227 | 9/2017 |
| DE | 102005035729 | 2/2007 |
| DE | 202006017724 | 5/2008 |
| DE | 102008021627 | 11/2009 |

(Continued)

*Primary Examiner* — Mi'schita' Henson

(74) *Attorney, Agent, or Firm* — Levine Bagade Han LLP

(57) ABSTRACT

The invention relates to a method for monitoring the operation of a crane, in which an overall center of gravity of the crane, possibly with a load attached thereto, is determined and monitored in terms of its position in relation to a tipping edge of the crane, wherein possible displacements of the overall center of gravity caused by possible changes in different operating and/or influencing variables, which comprise at least different crane movements, and resultant future overall centers of gravity are determined, wherein the most critical overall center of gravity in relation to the tipping edge is determined from the determined plurality of future overall centers of gravity and a possible restriction of crane movements is determined on the basis of the position of this most critical future overall center of gravity in relation to the tipping edge.

17 Claims, 4 Drawing Sheets

(56) References Cited

FOREIGN PATENT DOCUMENTS

| | | | | | |
|---|---|---|---|---|---|
| DE | 102011115224 | | | 4/2012 | |
| DE | 102014105618 | | | 10/2015 | |
| EP | 2578757 | | | 4/2013 | |
| JP | 2014091632 | A | * | 5/2014 | ............ B66C 23/78 |
| WO | WO 2020/104282 | | | 5/2020 | |

* cited by examiner

CRANE AND METHOD FOR MONITORING THE OPERATION OF SUCH A CRANE

CROSS-REFERENCE TO RELATED APPLICATIONS

This application is a continuation of International Patent Application Number PCT/EP2019/081274 filed Nov. 14, 2019, which claims priority to German Patent Application Number DE 10 2018 129 352.6 filed Nov. 21, 2018, the contents of which are incorporated herein by reference in their entireties.

BACKGROUND

The present invention relates to a method for monitoring the operation of a crane, in which an overall center of gravity of the crane, possibly with a load attached thereto, is determined and monitored in terms of its position in relation to a tipping edge of the crane. The invention further relates to a crane, in particular a revolving tower crane, with drive devices for crane movements and/or load movements, as well as a crane controller for controlling the drive devices, wherein the crane controller comprises a monitoring device for monitoring the crane load and restricting crane movements when a critical crane load is reached.

In the case of cranes such as construction cranes, for example mobile construction cranes and/or telescopic construction cranes or revolving tower cranes, a crane controller or a monitoring device implemented therein is usually used to monitor whether the stability of the crane is ensured or whether the crane load reaches a critical load limit, so that the crane is at risk of falling over or is endangered in another manner, in order then to switch off the corresponding drive devices of the crane in good time as required or to permit only those crane movements that reduce the crane strain or at least do not increase it any further. In particular, the hoisting load and the outreach of the hoisting load can be monitored, which can be done, for example, by determining the tensile force acting on the hoisting cable or a torque induced by this on the hoist cable winch, and—as far as the outreach is concerned—by the position of a trolley or a retracted trolley cable length. In dependence on the crane type, however, said variables can also be determined in a different way, wherein, for example, in the case of cranes having a luffable boom, the outreach can be determined via the luffing angle and, where necessary, telescopingly withdrawn boom length in each case.

With the determination of the hoisting load and the outreach thereof, as a result, there can be determined a lifting torque acting on the crane, which can be compared to the corresponding load limit in the form of a limit torque in order to ensure the stability of the crane. If the monitoring device detects that a load that is generally too heavy is being lifted or that a given hoisting load is being moved too far to the outside so that the outreach for this load becomes too big, the crane controller can, for example, stop the hoisting gear drive and the traversing trolley in order to ensure the stability of the crane.

However, the stability of the crane does not depend exclusively on said variables such as hoisting load and outreach, but is also affected by other operating and influencing variables, such as the motion speed and acceleration. For this reason, for example, the prior art document DE 10 2005 035 729 A1 proposes to continuously reduce the speed of the crane drives when the crane approaches its load limit due to a corresponding crane movement.

In addition, the stability of a crane depends not only on the lifting torque acting on the crane, but also on the support base on which the crane is placed or stands. Typically, cranes are supported on the ground by extendable floor supports, so that there is usually a support quadrangle defined by the connecting lines through the contact points. Such a support quadrangle results in a directional dependence of the stability, since in different rotational positions of the crane about the upright axis of rotation thereof the lifting torque is counteracted by a counter-torque of varying size, which results from the different lever arm of the support forces on the supports. Said supports define tipping edges from which the articulation point of the rotatable upper crane part is at different distances, depending on the direction in which said upper part is rotated.

In addition, variable adjustable support bases have been used more recently in order to be able to adapt the support system to the constricted space conditions. For example, if a crane is located in a very constricted space conditions on a roadside or a sidewalk, it is sometimes not possible to fully deploy the outriggers to span a maximum size four-point outrigger assembly. In order to be able to use the crane in said installation conditions, it is also possible to operate the crane with one or a plurality of bracing jibs only partially extended, which of course then affects the stability and needs to be taken into account by the monitoring device of the crane. Due to incomplete or different extension of the supports of the outrigger assembly, support surfaces differing from the square or rectangle can result, in which the tipping edges defined by the contact points or by straight lines connecting the contact points can no longer be rectangular or run parallel to each other. This further increases the directional dependence of the stability explained above, since the crane can only take up a smaller lifting torque when the load or the boom is rotated over the only partially extended supports, while the crane can transfer a larger lifting torque when the boom with the load is rotated over the fully extended supports.

In order to be able to ensure crane safety with such variably configurable ground supports, the prior art document DE 10 2008 021 627 A1 proposes to determine the tipping edges of the crane as a function of a respectively reached actual position of the supports and to determine the overall center of gravity of the crane system, i.e. of the crane with the load respectively attached thereto. The respectively determined overall center of gravity is then checked by the monitoring device to see whether it lies within the support surface spanned by the tipping edges. A display in the crane operator's cab shows the current position of the overall center of gravity in relation to the support surface defined by the tipping edges, so that the crane operator can stop the crane movement in time if the overall center of gravity is dangerously approaching a tipping edge.

Nevertheless, with such a monitoring of the overall center of gravity and the position thereof with regard to a tipping edge, it is not easy to provide, on the one hand, for efficient crane operation in which the crane operator can move a payload from a starting point to a destination point using the available travel speeds as far as possible, and, on the other hand, to provide for timely stopping or slowing down of the crane movements in order to safely avoid a critical crane strain. If, for example, large distance of the respectively detected overall center of gravity from a tipping edge is required as a safety buffer, the travelability or lifting capacity of the crane is quite strongly limited. If, vice versa, there is required only a smaller safety distance of the overall center of gravity from a respective tipping edge, a corresponding crane movement may not be stopped quickly enough.

SUMMARY

So proceeding from this, it is therefore the underlying object of the present invention to provide an improved crane as well as an improved method for monitoring the operation of a crane which avoids disadvantages of the prior art and further develops the latter in an advantageous manner. In particular, the aim is to ensure timely restriction of critical crane movements without unnecessarily restricting efficient operation of the crane with high handling capacities.

Said task is solved, in accordance with the invention, with a method as claimed in claim 1 and a crane as claimed in claim 12. Preferred embodiments of the invention are the subject-matter of the dependent claims.

It is therefore proposed not only to monitor the respectively detected overall center of gravity and the distance thereof from a respective tipping edge, but also to estimate in advance possible displacements of the overall center of gravity under various operating and influencing variables and, on the basis of the future overall center of gravity positions to be considered relative to the tipping edge, to estimate the remaining load capacity or stability reserve in order to be able to initiate necessary restrictions of the crane movements or countermeasures. According to the invention, possible displacement of the overall center of gravity caused by possible changes in different operating and/or influencing variables, which comprise at least different crane movements, and resultant future overall centers of gravity are determined, from which the most critical future overall center of gravity with respect to the tipping edge is then selected. On the basis of the position of this most critical future overall center of gravity in relation to a tipping edge, there is then determined a possible restriction of crane movements. Through such an anticipatory determination of future overall center of gravity positions, taking into account different operating and/or influencing variables and their changes, there can be initiated in time necessary countermeasures, while leaving the 24 unnecessarily restricting crane operation and performance intact.

In particular, on the basis of the distance of the selected most critical future overall center of gravity from the nearest tipping edge, an outreach reserve can be determined, i.e. the distance that can still be travelled, while still increasing the outreach, without endangering the stability of the crane. In the case of a revolving tower crane, said outreach reserve can be the distance which for the trolley on the boom can still be travellable outwards. However, taking into account the directional dependence of the permissible outreach due to the typically non-circular support surface of the outrigger assembly of the crane, a movement reserve for a possible rotational movement of the crane can also be determined on the basis of said distance of the most critical future overall center of gravity from the tipping edge. For example, if the crane is to turn about its upright axis of rotation to the right towards a less extended supporting foot, said distance can be used as a motion reserve to limit the angle of rotation to the right.

Said most critical future overall center of gravity may be determined from the plurality of possible future overall center of gravity locations based, for example, on the distances of the possible future overall centers of gravity from the tipping edges of the support base of the crane. If all determined possible future overall centers of gravity are within the support surface spanned by the tipping edges of the support base, the one with the smallest distance from a tipping edge can be selected as the most critical overall center of gravity. However, if one or a plurality of possible future overall centers of gravity lie outside said support base, the overall center of gravity lying outside or the overall center of gravity lying outside at the greatest distance from a tipping edge can be selected.

On the basis of the distance of the selected most critical overall center of gravity from the nearest tipping edge, the remaining lifting capacity reserve or stability reserve can be determined, wherein for the described case of a future overall center of gravity lying outside the support base, a negative lifting capacity reserve is obtained, which can lead, for example, to the monitoring device shutting down the crane.

Advantageously, the device for determining the future overall centers of gravity takes into account not only the various possible crane movements and the mass forces induced thereby from, for example, a possible rotational movement, a possible lifting and/or a possible crane trolley movement, but also any influencing variables.

In particular, a possible displacement of the overall center of gravity can be determined, which may result from a wind load. For example, a wind force can be used for this, which results from the maximum permissible wind speed at which the crane may be operated, or results from the difference between a current wind speed and said maximum permissible wind speed.

Advantageously, different wind directions and the resulting different displacements of the overall center of gravity can be determined and taken into account, wherein advantageously only one or a few wind directions need to be taken into account which have an unfavourable impact on the stability of the crane. For example, wind from behind and/or wind from the side with the maximum permissible wind speed, respectively, can be taken into account for determining a possible displacement of the overall center of gravity.

In a further development of the invention, a structural deformation of the crane may also be determined for determining the possible displacement of the overall center of gravity, which may be based on current operating and/or influencing variables and/or changes in these operating and/or influencing variables. In particular, for example, the crane deformation and the resulting displacement of the overall center of gravity can be calculated, which occurs due to a given wind load, for example at a given wind speed with wind from the front or wind from the side. Alternatively or additionally, a crane deformation can be calculated, which may result from mass forces arising from lifting the load and/or moving the trolley and/or rotating the crane about the upright axis of rotation thereof and/or downward luffing or upward luffing of the boom.

If, for example, the outreach of a load attached to a hook on a revolving tower crane is increased by moving the trolley, the overall center of gravity is shifted outwards not only by the travel of the trolley but also by the resulting bending deformation of the tower. In a similar manner, the overall center of gravity can shift if, for example, a gust of wind from behind deforms the tower forward.

Furthermore, centrifugal forces can be determined and taken into account for the displacement of the overall center of gravity. Such centrifugal forces can, on the one hand, pull the load on the lifting hook outwards when the crane rotates about its upright axis of rotation, depending on the lowering depth of the lifting hook. On the other hand, additional deformation of the tower or also of the telescopic luffing boom can occur if, in addition to the load, a corresponding centrifugal torque is also pulling on the crane.

Alternatively or additionally to said influencing variables, given failure conditions and the effect thereof on a displacement of the overall center of gravity can, for example, also be taken into account. In particular, rope breakage can be taken into account and its effect on a displacement of the overall center of gravity can be determined. Taking into account the fact of rope breakage may mean, on the one hand, that the overall system lacks the hook load and its share in the overall center of gravity and, on the other hand, that the sudden breakage of the hook load causes a dynamic load to act on the crane, in particular in the form of a load towards the rear of the crane due to the resetting of the previously existing deformations under load.

With regard to the possible displacements to be determined and the resulting future overall centers of gravity, all possible crane movements are advantageously taken into account, wherein all axes of movement can be considered in each of their two directions. In the case of a revolving tower crane, particular consideration may be given to outward and inward travel of the trolley, raising and lowering of the lifting hook, and rightward and leftward rotation of the boom about the upright axis of rotation.

For the determination of the mass forces resulting from such travel of the trolley, lifting and lowering of the lifting hook and rotating of the boom or other crane movements, the maximum motion speeds and/or accelerations provided for by the crane controller can be used as a basis. In case that the monitoring device has not yet specified any limitation of the motion speeds, what can be used as a basis are maximum travel speeds and travel accelerations. If there has already been a limitation of the travel speeds or even of a single travel speed, since, for example, the permissible load limits have already been approached, the mass forces can be determined on the basis of the already limited speed and/or acceleration and a possible displacement of the overall center of gravity can be calculated therefrom.

The restriction made by the monitoring device on the basis of the position of the most critical possible future overall center of gravity with respect to a tipping edge can basically be of different types. For example, all crane drives can be restricted accordingly, for example by setting a reduced maximum speed and/or by setting individual operation of the crane drives, in which only one of the plurality of crane drives can be operated simultaneously.

In particular, the monitoring device can also selectively choose or make the restriction to be made, in particular on the basis of the crane movement that was the basis for the displacement and the resulting overall center of gravity, which was then selected as the most critical overall center of gravity. If, for example, the most critical overall center of gravity has resulted from a counterclockwise rotational movement of the crane, for example because this would lead to an only partially extended support, the monitoring device can, for example, lock the slewing gear in the corresponding direction of rotation, while lifting and lowering movements of the lifting hook are still possible without restriction. In addition to said selective restriction, a further crane movement increasing the tilt behaviour can also be prevented, restricted or limited, for example a further outward movement of the trolley of a revolving tower crane.

In an advantageous further embodiment of the invention, the tipping edges of the crane are determined on the basis of the respective extension state of the supports of the outrigger assembly in order to be able to take into account different support configurations. For example, sensors may detect the current extension state of the respective support, and then use the detected extension values to determine the support base or tipping edges, which May be determined on the basis of connecting lines through the contact points.

Advantageously, the position and/or orientation of the tipping edges can also be derived from a data memory in which the tipping edges and the position thereof and orientation for different extension states can be stored.

The monitoring device of the crane controller can calculate the possible displacements and possible future positions of the overall center of gravity and their position relative to the tipping edges in each case on the basis of a respective actual state, in particular on the basis of respective current sensor values of the relevant parameters. The monitoring device takes the current overall center of gravity as the starting point and determines the possible shifts of the current overall center of gravity and the resulting future possible overall centers of gravity on the basis of the possible operating and influencing variables and their possible changes, such as an actuation of the crane drives, said wind forces or possible deformations, in order to then carry out restrictions of the crane movements in said manner.

Alternatively or additionally, however, the determination of the theoretically possible, future center of gravity positions can also be carried out outside the crane control and monitoring system, in particular in advance on the basis of a model which takes into account the possible different set-up states of the crane and taken into account the relevant operating and/or influencing variables and their possible changes. The parameter sets calculated in advance on the basis of the model can be made available to the control device or the monitoring device of the crane, for example by means of a data memory in which the respective parameter sets are stored. The monitoring device then only needs to access the set parameter sets and, on the basis of the current overall center of gravity and/or current positions of slewing gear, trolley, lifting hook and/or boom, call up respectively a relevant parameter set, which contains the future center of gravity positions and is valid for a respective current crane position and configuration.

BRIEF DESCRIPTION OF THE DRAWINGS

The invention is explained in more detail below on the basis of a preferred exemplary embodiment and the corresponding drawings. The drawings show.

DETAILED DESCRIPTION

Figure 1:
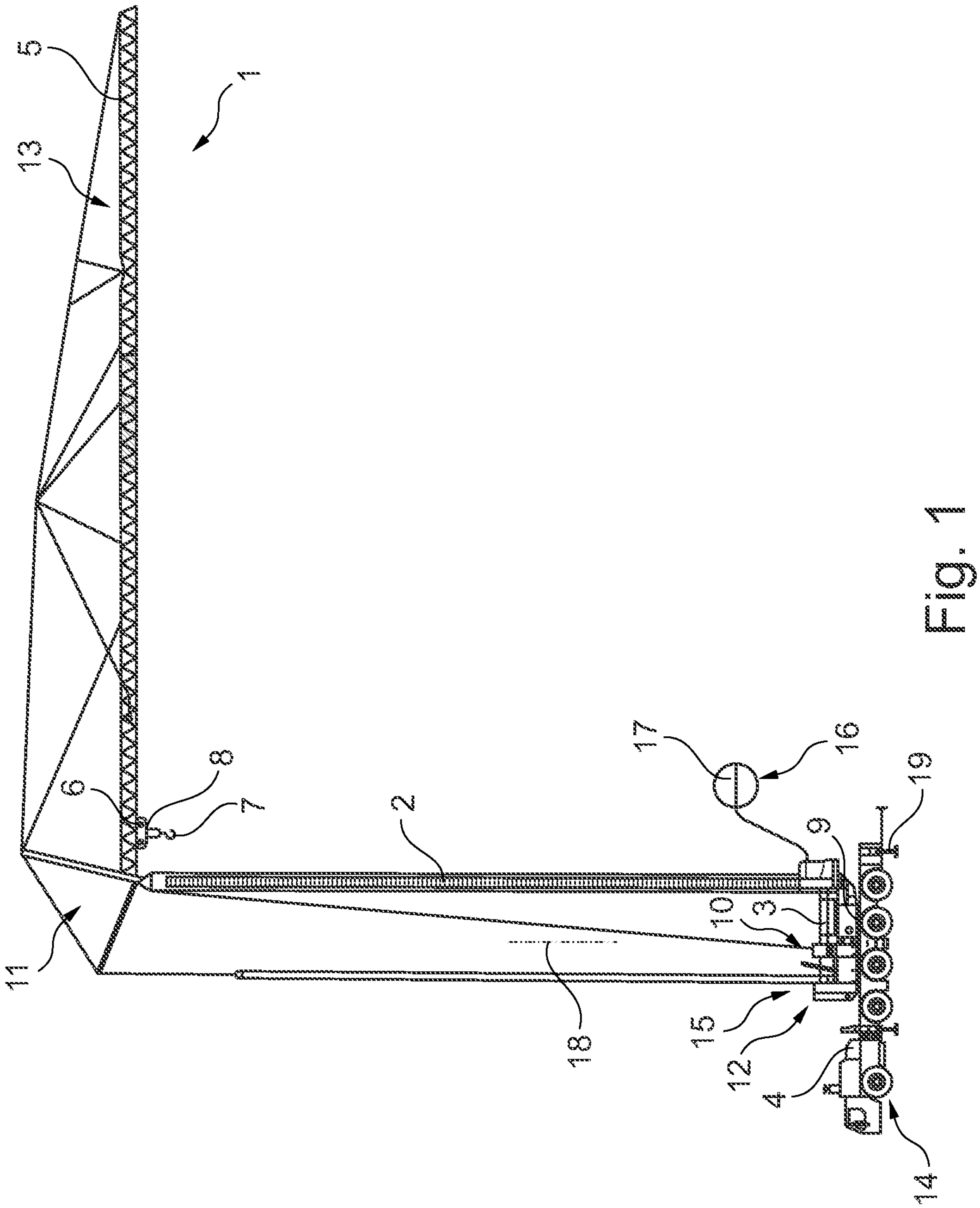
FIG. 1: a schematic side view of a mobile revolving tower crane the tower of which, supported on a rotatable superstructure, carries a boom with trolley and the undercarriage of which is supported on the ground by extendable supports.

As shown in FIG. 1, the crane 1 may be in the form of a mobile construction crane or mobile revolving tower crane comprising a tower 2 supported on a turntable 3 which sits on an undercarriage 4 and is rotatable about an upright axis of rotation by means of a slewing gear drive device 9. Said undercarriage 4 may be in the form of a truck or otherwise movably configured, but may also be a fixedly anchored or supported support base.

The tower 2 may support a boom 5 which may be luffed up and down about a horizontal, transverse luffing axis, cf. FIG. 1. A luffing drive device 12 for the boom 5 may, for example, luff the boom 5 via the guy cable construction.

A trolley 6 may be mounted longitudinally movable on said boom 5, and may be moved by a trolley drive device 11, for example via a corresponding trolley cable. A hoist cable 8 can run over said trolley 6, to which a load rigging, for example in the form of a lifting hook 7, can be attached in order to lift a load in a commonly known manner. A hoisting gear drive device 10 can drive a hoisting cable drum accordingly for this purpose.

Optionally, and therefore only indicated, the crane may comprise further drive devices, for example a telescopic boom with a telescoping drive device 13, a ballast adjusting drive device 15 for adjusting a ballast or a traversing drive device 14 for traversing the entire crane could be provided, which as a rule shall not be the case in the drawn version of the mobile construction crane, as it is jacked up for lifting loads.

The different drives are controlled by a central crane controller 16 which, in a commonly known manner known, may provide appropriate operating levers or other input means for a crane operator to control the various axes of movement of the crane. The crane controller 16 comprises a monitoring device 17 which monitors, by means of appropriate sensors, the crane strain acting on the crane, in particular the hoisting load taken up by the lifting hook 7 and the projection which the lifting hook 7 has with respect to the standing base of the crane. Said projection can be determined, for example, by the position of the trolley 6 on the boom 5 and, if necessary, the luffing angle of the boom 5 with respect to the horizontal.

The position or operating state of said drive devices and/or the crane elements which can be moved by them can be monitored by corresponding sensors, so that the crane controller 16 or the monitoring device 17 knows the respective current crane position, i.e. in particular the angle of rotation about the upright crane axis of rotation 18 and thus the orientation of the boom 5, the position of the trolley 6 in terms of the distance from the tower 2, the lowering depth of the lifting hook 6 and, if necessary, the luffing angle of the boom 5 and the position of the ballast. In addition, a lifting load sensor that measures the load on the hoisting gear 10, for example, can be used to determine the load picked up by the lifting hook 6.

Figure 2:
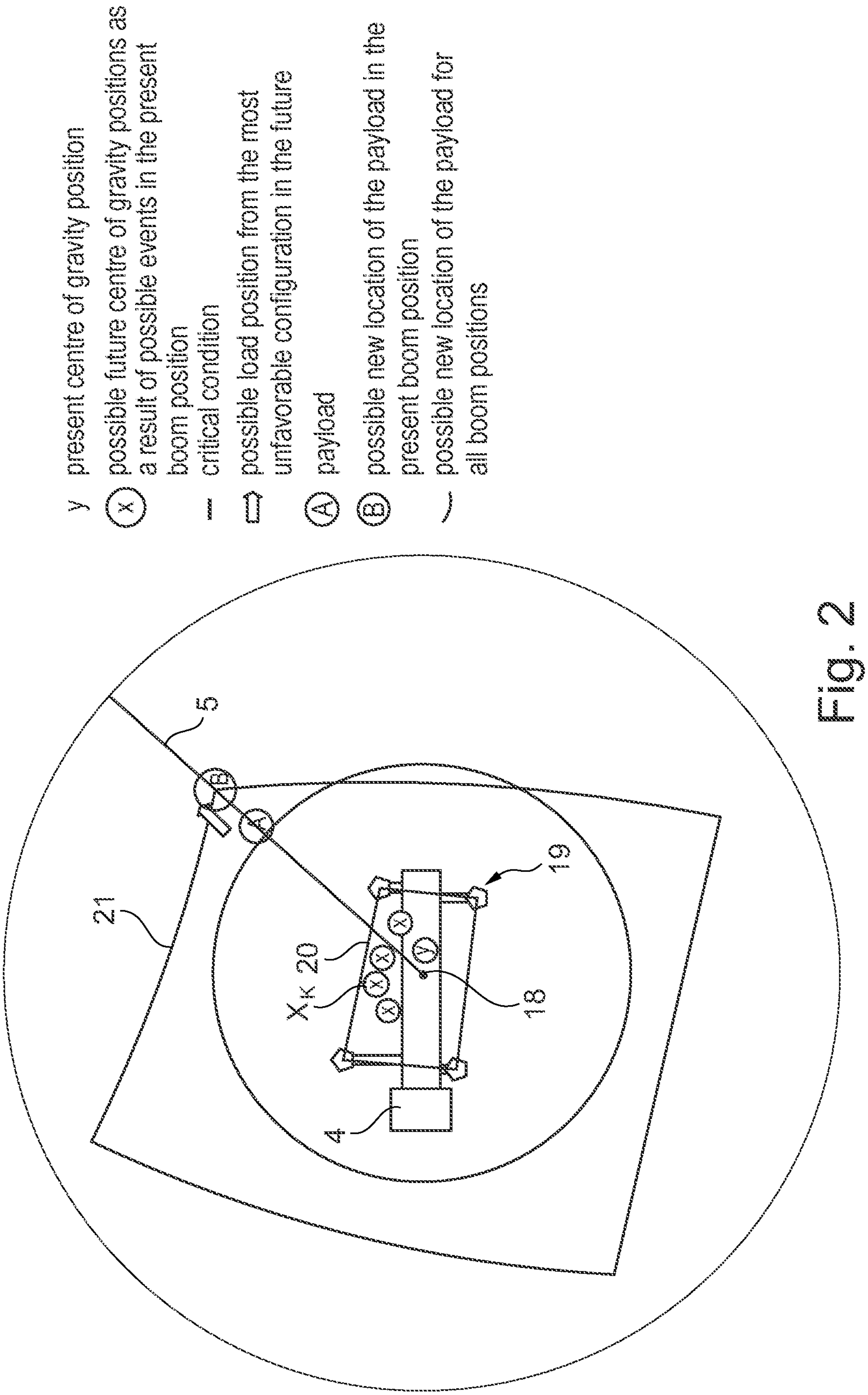
FIG. 2: a top view of the crane of FIG. 1, showing the tipping edges defined by the extended supports of the outrigger assembly, the current center of gravity position and possible future center of gravity positions, and the possible displacement of the payload resulting from the possible future center of gravity positions and the resulting stability reserve.

From these current state variables of the crane 1, the current overall center of gravity of the overall system consisting of the crane 1 and the hoisting load attached to the lifting hook 7 can be determined by the monitoring device 17, in particular with regard to the position of the current overall center of gravity relative to the footprints defined by the outrigger assembly 19, which is shown in FIG. 2.

In FIG. 2, the current position of the overall center of gravity, which the monitoring device 17 knows or can determine from said state variables, for example can calculate or can read out from a parameter set determined for the crane configuration, is marked with the letter y. The current position of the overall center of gravity is shown in FIG. 2.

On the other hand, said monitoring device 17 can determine the tipping edges 20 which are connecting lines through the contact points of the outrigger assembly 19. As FIG. 2 shows, the outrigger assembly 19 may comprise, for example, four supports which are extendable in pairs towards opposite sides of the undercarriage 4 and are lowerable to the ground in the respective extended position. As FIG. 2 shows, the supports of the outrigger assembly 19 can be extended to different extents, so that different geometries of the support 9 surface defined by the tipping edges 20 can result. In this respect, it is possible in principle for said supports to be extended in any desired manner, for example steplessly or step-wise, so 11 that any desired multiplicity of differently configured contact or support surfaces can result. In practice, however, it may be useful to allow only several, few extension states for the supports, for example such that each support may be extended 1/4, 2/4, 3/4 and 4/4, or for example 1/3, 2/3 and 3/3 of the width. The resulting tipping edges 20 and their orientation can either be currently calculated by the monitoring device on the basis of sensor signals or can also be read out for the permitted and/or detected extension states in the form of stored values in parameter sets.

Based on the current overall center of gravity position, which is marked with y in FIG. 2, the monitoring device 17 can determine the displacement of the overall center of gravity and, accordingly, possible future overall center of gravity positions, marked with x in FIG. 2, wherein the possible displacements can be determined for various operating and/or influencing variables and/or changes thereto.

In particular, for the possible displacement of the current overall center of gravity towards a possible future overall center of gravity, the different crane movements can be taken into account, for example a rotation of the crane about the upright crane rotation axis 18, a lifting or lowering of the load on the lifting hook 7, a movement of the trolley 6, a luffing up or luffing down of the boom 5, possibly inward telescoping and outward telescoping of the boom 5 and/or a movement of the ballast.

In addition to the possible crane movements and the resulting mass forces, external factors influencing the crane can also be taken into account to determine the possible shifts in the position of the center of gravity. In particular, wind forces or a wind load on the crane 1 can be taken into account.

In this way, such a wind load can, for example, be taken into account virtually in the form of an additional mass force attached to the lifting hook when the wind pushes against the tower from behind. Alternatively or additionally, however, such a wind force can also be taken into account in the form of an actual displacement of the overall center of gravity, in particular in that the wind deflects the hoisting load attached to the lifting hook, wherein the lowering depth of the lifting hook 7 can be taken into account here if necessary, since the load can be moved further by the wind when the load hook is lowered than when it is moved close to the trolley. Alternatively or additionally, however, a deformation of the crane, in particular a bending of the tower 2 due to a wind load, can also be taken into account, as explained at the beginning. For example, if a wind force pushes against the tower 2 from behind, the tower 2 will deform a little forward towards the boom 3, increasing the outreach of the lifting hook 7 and correspondingly shifting the overall center of gravity of the system.

For the determination of the possible future total centers of gravity x, in particular also a deformation of the crane 1 can be taken into account, which can occur not only in said manner due to wind loads, but also due to other load variables, in particular the lifting load 17 taken up at the lifting hook 7 and mass forces from a twisting of the crane 1, a movement of the trolley 6, a lifting or lowering of the lifting hook 7 or another of the explained crane movements.

Since the crane structure and therefore its deformation properties under loads are known, its deformation can be calculated or determined from said mass forces, wind forces and other loads acting on the crane. Such deformations of the crane structure can be determined, for example, on the basis of a model, wherein the deformations occurring for various load variables can be stored as a parameter set and made available to the crane controller 16 or the monitoring device 17 so that they can be provided on demand.

Alternatively, said deformations could also be calculated directly on the basis of the influencing variables.

Proceeding from the current overall center of gravity and its position, the monitoring device 17 acts out, so to speak, the possible operating and influencing variables and their possible changes, in particular possible crane movements, possible wind loads and possible crane deformations, and from this determines different possible displacements and the resulting possible future center of gravity positions, which are marked with the reference variable x in FIG. 2.

The monitoring device 17 analyses the possible future center of gravity positions x for their relative position to the tipping edges 20, and selects as the most critical future overall center of gravity the one closest to one of the tipping edges 20. In FIG. 2, this critical future total center of gravity is also marked with the parameter xx in addition to the letter x.

On the basis of the distance of the critical future total center of gravity xx from the nearest tipping edge 20, the monitoring device 17 can determine the remaining load or stability reserve, and then determine from said load or stability reserve how far the outreach of the crane can still be increased, for example by moving the trolley 6 outwards or luffing the boom 5 or telescoping the boom 5.

The possibility of movement or increase of the outreach, which was determined in said manner from the critical future overall center of gravity, while the stability is still ensured, is symbolised in FIG. 2 by the arrow which connects the two trolley positions A and B. The arrow indicates the position of the trolley.

Taking into account the tilt edges 20 and the respective outreach and position, which may change due to the extension of the supports, the monitoring device 17 can determine the possible new locations of the payload for all boom positions or rotational positions of the crane 1 for a respective hoisting load attached to the lifting hook 7. These possible new locations of the payload for all boom positions are marked in FIG. 2 with the reference numeral 21 and result-approximately, roughly speaking—in a quadrilateral, the main axes of which are approximately oriented to the main axes of the footprint of the outrigger assembly 19, which are determined by the extension states of the supports.

As FIG. 2 illustrates, this outreach limit 21 is directional for a given hoisting load carried by the lifting hook 6 and varies for different boom positions or as a function of the angle of rotation of the boom 5 about the upright crane rotation axis 18.

Figure 3:
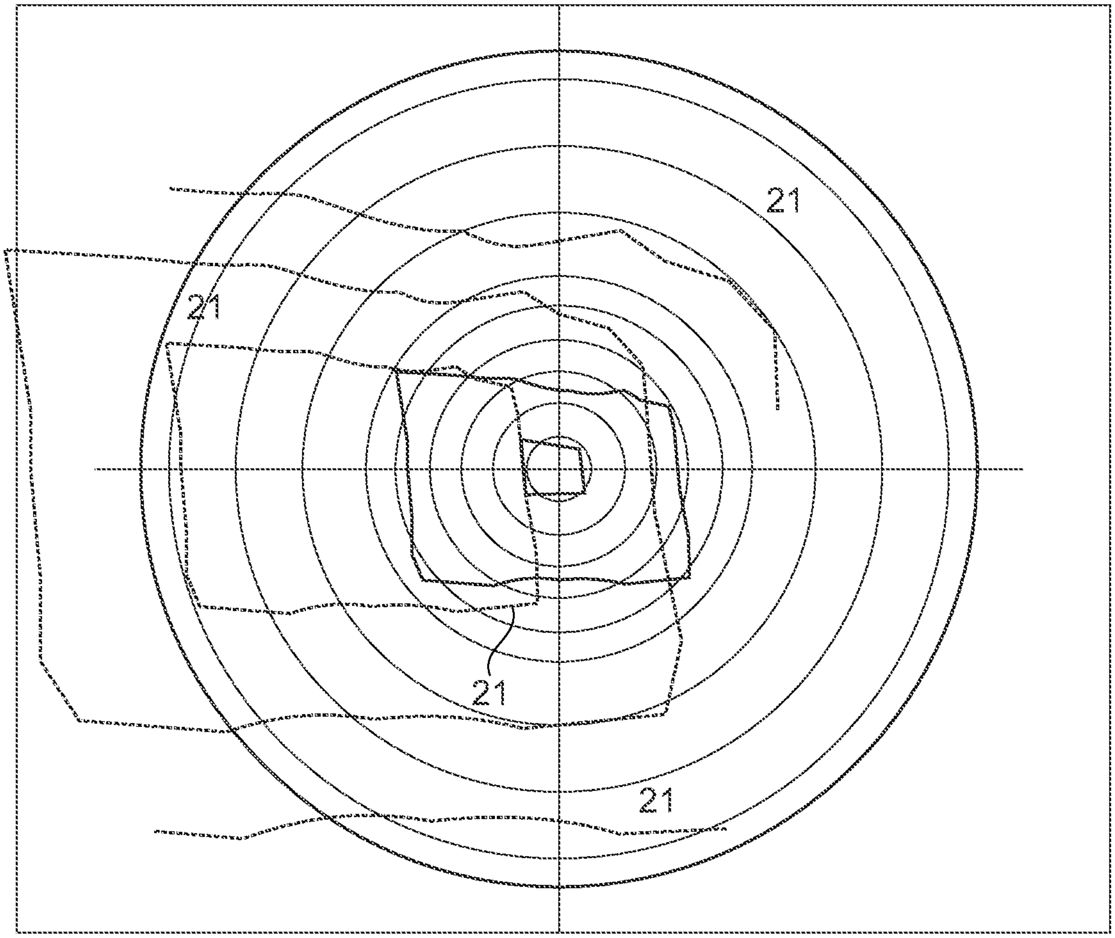
FIG. 3: a representation of the permissible outreach or outreach limits resulting for various lifting loads and for different boom positions when the rs of the outrigger assembly are fully extended.

As FIG. 3 shows, for different payloads or different hoisting loads attached to the lifting hook 7, corresponding outreach limits 21 can be determined which, respectively, become larger or smaller, on the basis of which the crane 1 or the monitoring device thereof 17 knows how far a load attached to the lifting hook 7 can still be moved by corresponding crane movements. Since said outreach limits 21 are not circularly shaped around the crane rotation axis 18, but are—approximately, roughly speaking-rectangularly or quadrangularly contoured, said outreach limits 21 can be achieved not only by moving the trolley 6 outwardly or by luffing the boom 5, but also by rotating the crane 1 about its upright crane rotation axis 18.

Accordingly, the monitoring device 17 can selectively shut down and/or slow down and/or limit the crane movement that would result in reaching or further approaching said outreach limit 21, that is, in particular, an outward movement of the trolley 6 and a corresponding rotational movement about the crane rotation axis 18.

Figure 4:
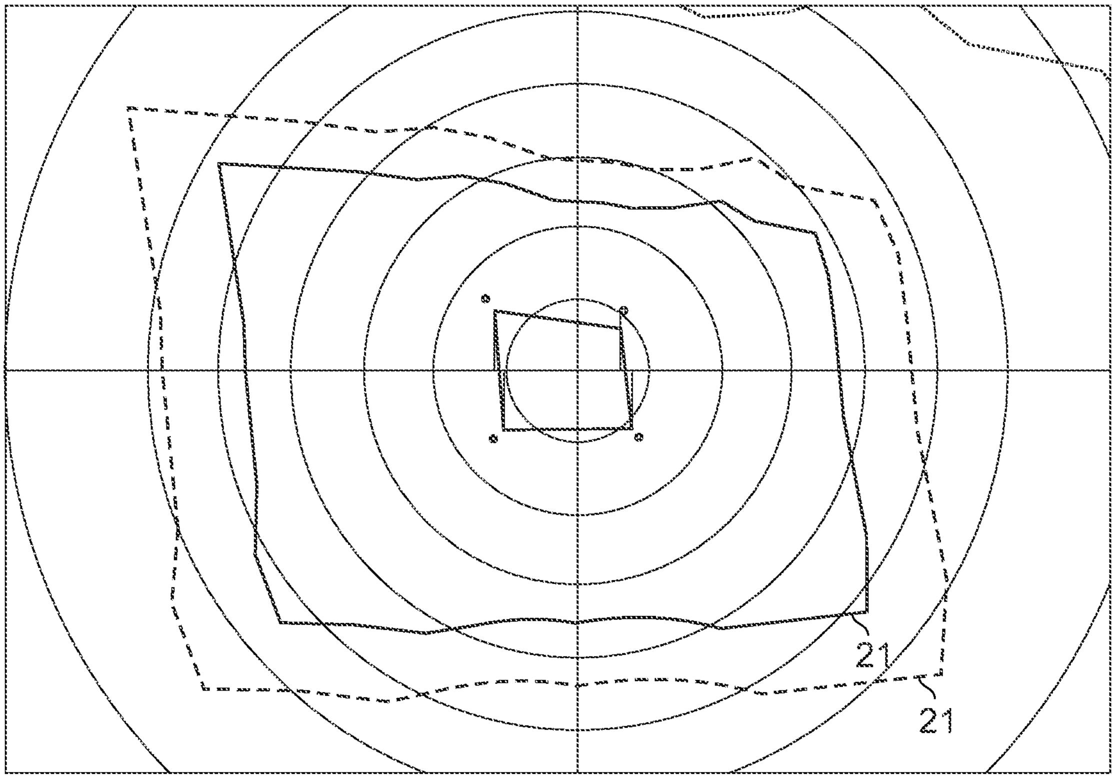
FIG. 4: a representation of the outreach limits for different lifting loads similar to FIG. 3, but for supports of the outrigger assembly that are not fully extended.

As a comparison of FIGS. 3 and 4 shows, differently shaped outreach limits 21 result for different extension states of the supports of the outrigger assembly 19.

Therefore, the described method for monitoring the operation of a crane as well as, concomitantly, the corresponding crane with the monitoring device suitably designed therefore are characterized, inter alia, by the following advantageous aspects:

- The calculation method provides knowledge of all possible center of gravity positions of the entire system, which can arise due to external influences (e.g. wind), mass forces, certain failure states (e.g. rope breakage) or other influences.
- On the basis of the respective crane configuration and load position, all system states with the associated center of gravity positions that could arise during operation are taken into account.
- In the present method, the deformations of the crane system are taken into account when determining the positions of the center of gravity.

- In this way, from all the examined states, those are used which would lead to the smallest safety against tilting of the system or to the exceeding of individual component loads.
- The underlying calculation method is designed in such a way that the calculation regulations and calculation standards specified for the respective existing crane configuration and the current crane application are met.
- The method provides the possible center of gravity positions of the system in advance for all possible system states. From this, the permitted load locations and the associated gradients for all possible directions of movement of the upper crane part and the load can be determined at any time and used to control the crane movements.
- When determining the permissible load size and load position, additional limits stored in the control system are also taken into account. This allows other limiting system states of the assemblies involved to be taken into account.
- Support pressures could be stored with in the controller and used for additional monitoring/redundancy.

We claim:

1. A method for monitoring an operation of a crane with a monitoring device, wherein the crane comprises a boom from which a lifting hook is suspended via a hoist cable, wherein the boom is configured to be rotated about an upright rotation axis via a slewing gear drive device, wherein the lifting hook is configured to be raised and lowered relative to the boom via a hoisting gear drive device, wherein a horizontal outreach of the lifting hook from the upright rotation axis of the boom is configured to be increased or decreased via a trolley drive device, a luffing drive device, or a telescoping drive device, wherein the trolley drive device is configured to drive a trolley along the boom, wherein the hoist cable is suspended from the trolley, wherein the luffing drive device is configured to luff the boom up and down about a horizontal transverse luffing axis, wherein the telescoping drive device is configured to telescope the boom, wherein the monitoring device comprises a sensor for detecting a rotational position of the boom about the upright rotation axis, a load sensor for detecting a load attached to the lifting hook, and at least one of the following sensors: a trolley position sensor for detecting a trolley position along the boom, a luffing angle sensor for detecting a luffing angle of the boom about the horizontal transverse luffing axis, and a boom length sensor for detecting a telescoped boom length of the boom, wherein the method comprises:

calculating, via the monitoring device, a current overall center of gravity of the crane based on sensor signals representative of the load attached to the lifting hook, the rotational position of the boom about the upright rotation axis, and the horizontal outreach of the hoist cable from the upright rotation axis;

calculating, via the monitoring device, possible future overall centers of gravity based on the calculated current overall center of gravity and possible crane movements that change the rotational position of the boom about the upright rotation axis as generated by the slewing gear drive device and that change the horizontal outreach of the hoist cable from the upright rotation axis as generated by at least one of the trolley drive device, the luffing drive device, and the telescoping drive device;

calculating, via the monitoring device, distances of the calculated possible future overall centers of gravity from tipping edges of a support base of the crane stored in a data memory;

selecting, via the monitoring device, one of the calculated possible future overall centers of gravity outside the tipping edges that is farthest from one of the tipping edges as a most critical overall center of gravity if some of the calculated possible future overall centers of gravity are outside the tipping edges or selecting, via the monitoring device, one of the calculated possible future overall centers of gravity inside the tipping edges that is closest to one of the tipping edges as the most critical overall center of gravity if none of the calculated possible future overall centers of gravity are outside the tipping edges;

calculating, via the monitoring device, a remaining outreach reserve in terms of a possible increase of the horizontal outreach and a movement reserve for a possible rotational movement of the boom about the upright rotation axis for the selected most critical overall center of gravity;

shutting down and/or slowing down, via the monitoring device, at least one of the trolley drive device, the luffing gear drive device, and the telescoping drive device in response to the calculated remaining outreach reserve being smaller than an allowable outreach reserve;

shutting down and/or slowing down, via the monitoring device, actuation of the slewing gear drive device in response to the calculated movement reserve being smaller than an allowable movement reserve; and determining, via the monitoring device, a possible restriction of crane movements based on the selected most critical overall center of gravity, wherein possible displacements of the current overall center of gravity are caused by possible changes in different operating and/or influencing variables comprising different crane movements.

2. The method of claim 1, wherein the calculated distances of the calculated possible future overall centers of gravity comprise a calculated distance of the selected most critical overall center of gravity from one of the tipping edges, the method further comprising determining a load reserve and/or stability reserve based on the calculated distance of the selected most critical overall center of gravity from the one of the tipping edges, on the basis of which crane movements which increase tilt behavior and/or reduce stability are selectively restricted or released.

3. The method of claim 1, wherein the possible restriction of crane movements comprises switching off and/or limiting a crane movement, reducing the maximum speed or maximum acceleration of a crane movement, and/or limiting a crane drive to a single actuation while other crane drives are stopped.

4. The method of claim 1, further comprising determining a possible displacement of the current overall center of gravity and a position of at least one of the calculated possible future overall centers of gravity based on a maximum permissible wind load.

5. The method of claim 4, further comprising determining the possible displacement of the current overall center of gravity based on a wind load from at least one determined wind direction.

6. The method of claim 5, wherein the at least one determined wind direction comprises a wind direction from behind and/or a wind direction from the side.

7. The method of claim 1, further comprising determining a possible displacement of the current overall center of gravity and a position of at least one of the calculated possible future overall centers of gravity as a consequence of a deformation of the crane.

8. The method of claim 1, further comprising determining a possible displacement of the current overall center of gravity and at least one of the calculated possible future overall centers of gravity based on the influence of mass forces from crane movements including rotating, lifting and/or travel of the trolley.

9. The method of claim 1, further comprising determining a possible displacement of the current overall center of gravity and a position of at least one of the calculated possible future overall centers of gravity based on a centrifugal force acting on the crane and/or the load.

10. The method of claim 1, further comprising determining the tipping edges and positions and orientations thereof, relative to the upright rotation axis as a function of an extension distance of supports of an outrigger assembly.

11. The method of claim 1, further comprising determining for the load attached to the lifting hook, based on the tipping edges, positions of the tipping edges, and determined possible displacements of the current overall center of gravity, an extension state which assumes different values for different rotational positions of the crane.

12. The method of claim 11, further comprising restricting, based on an outreach limit for the load attached to the lifting hook, a movement of the trolley outwards and/or luffing of the boom and a rotation of the crane about the upright rotation axis.

13. The method of claim 11, wherein the outreach limit has a non-circular shape.

14. The method of claim 11, wherein the outreach limit does not have a circular shape around the upright rotation axis.

15. The method of claim 1, wherein the crane comprises a revolving tower crane.

16. A crane comprising:

a boom from which a lifting hook is suspended via a hoist cable;

a trolley from which hoist cable is suspended;

drive devices for crane movements and/or load movements, wherein the drive devices comprise a slewing gear drive device, a hoisting gear drive device, a trolley drive device, a luffing drive device, and a telescoping drive device, wherein the boom is configured to be rotated about an upright rotation axis via the slewing gear drive device, wherein the lifting hook is configured to be raised and lowered relative to the boom via the hoisting gear drive device, wherein a horizontal outreach of the lifting hook from the upright rotation axis of the boom is configured to be increased or decreased via the trolley drive device, the luffing drive device, or the telescoping drive device, wherein the trolley drive device is configured to drive the trolley along the boom, wherein the luffing drive device is configured to luff the boom up and down about a horizontal transverse luffing axis, wherein the telescoping drive device is configured to telescope the boom;

a crane controller for controlling the drive devices, wherein the crane controller comprises a monitoring device, wherein the monitoring device comprises a sensor for detecting a rotational position of the boom about the upright rotation axis, a load sensor for detecting a load attached to the lifting hook, and at least one of the following sensors: a trolley position sensor for detecting a trolley position along the boom, a luffing angle sensor for detecting a luffing angle of the boom about the horizontal transverse luffing axis, and a boom length sensor for detecting a telescoped boom length of the boom;

wherein the monitoring device is configured to monitor crane strain and restrict crane movements when critical crane strains are reached wherein the monitoring device is configured to calculate a current overall center of gravity of the crane based on sensor signals representative of the load attached to the lifting hook, the rotational position of the boom about the upright rotation axis, and the horizontal outreach of the hoist cable from the upright rotation axis;

wherein the monitoring device is configured to calculate possible future overall centers of gravity based on the calculated current overall center of gravity and possible crane movements that change the rotational position of the boom about the upright rotation axis as generated by the slewing gear drive device and that change the horizontal outreach of the hoist cable from the upright rotation axis as generated by at least one of the trolley drive device, the luffing drive device, and the telescoping drive device;

wherein the monitoring device is configured to calculate distances of the calculated possible future overall centers of gravity from tipping edges of a support base of the crane stored in a data memory;

wherein if some of the calculated possible future overall centers of gravity are outside the tipping edges, the monitoring device is configured to select one of the calculated possible future overall centers of gravity outside the tipping edges that is farthest from one of the tipping edges as a most critical overall center of gravity and wherein if none of the calculated possible future overall centers of gravity are outside the tipping edges, the monitoring device is configured to select one of the calculated possible future overall centers of gravity inside the tipping edges that is closest to one of the tipping edges as the most critical overall center of gravity;

wherein the monitoring device is configured to calculate a remaining outreach reserve in terms of a possible increase of the horizontal outreach and a movement reserve for a possible rotational movement of the boom about the upright rotation axis for the selected most critical overall center of gravity;

wherein the monitoring device is configured to shut down and/or slow down at least one of the trolley drive device, the luffing gear drive device, and the telescoping drive device in response to the calculated remaining outreach reserve being smaller than an allowable outreach reserve;

wherein the monitoring device is configured to shut down and/or slow down actuation of the slewing gear drive device in response to the calculated movement reserve being smaller than an allowable movement reserve; and wherein the monitoring device is configured to determine displacements of the current overall center of gravity as a result of changes in different operating and/or influencing variables comprising different crane movements, and wherein the monitoring device is configured to determine a possible restriction of crane movements based on the selected most critical overall center of gravity.

17. The crane of claim 12, wherein the crane comprises a revolving tower crane.

* * * * *